(12) United States Patent
Stone et al.

(10) Patent No.: US 9,653,824 B2
(45) Date of Patent: May 16, 2017

(54) REDUCED TEMPERATURE ENERGY STORAGE DEVICE

(71) Applicant: Maxwell Technologies, Inc., San Diego, CA (US)

(72) Inventors: Kevin T. Stone, San Diego, CA (US); Steven Watts, San Diego, CA (US); Steven R. Shelton, Escondido, CA (US); Douglas G. Schafer, San Diego, CA (US); Ishmael D. Rahimian, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 15/091,864

(22) Filed: Apr. 6, 2016

(65) Prior Publication Data

US 2016/0301148 A1 Oct. 13, 2016

Related U.S. Application Data

(60) Provisional application No. 62/145,987, filed on Apr. 10, 2015.

(51) Int. Cl.
| | | |
|---|---|---|
| *H01R 11/11* | (2006.01) | |
| *H01M 2/20* | (2006.01) | |
| *H01R 11/28* | (2006.01) | |
| *H01M 10/613* | (2014.01) | |
| *H01G 9/008* | (2006.01) | |

(Continued)

(52) U.S. Cl.
CPC ............. *H01R 11/11* (2013.01); *H01G 9/008* (2013.01); *H01G 11/10* (2013.01); *H01M 2/204* (2013.01); *H01M 2/206* (2013.01); *H01M 10/613* (2015.04); *H01R 11/01* (2013.01); *H01R 11/288* (2013.01); *H01M 10/6551* (2015.04); *H01M 10/6561* (2015.04)

(58) Field of Classification Search
CPC .... H01R 23/7073; Y02E 60/12; H01M 2/206; H01L 23/4006; F21V 29/004
USPC .......................................... 439/627, 485, 487
See application file for complete search history.

(56) References Cited

U.S. PATENT DOCUMENTS

| | | | |
|---|---|---|---|
| 2,449,568 A | * | 9/1948 | Shriro .................... F21L 4/00 30/43.92 |
| 3,142,309 A | | 7/1964 | Remenyik |

(Continued)

FOREIGN PATENT DOCUMENTS

| | | |
|---|---|---|
| CN | 203521187 | 4/2014 |
| JP | 2009 245730 | 10/2009 |
| WO | WO 2014/120688 | 8/2014 |

OTHER PUBLICATIONS

Grbovic, "Ultra-capacitors in power conversion systems: analysis, modeling and design in theory and practice," John Wiley & Sons, Copyright 2014 (Published Online Oct. 25, 2013).

*Primary Examiner* — Gary Paumen
(74) *Attorney, Agent, or Firm* — Knobbe Martens Olson & Bear LLP

(57) ABSTRACT

An energy storage system is disclosed. The energy storage system includes a first energy storage cell, a second energy storage cell, and a first interconnect connecting the first and second cells. The interconnect includes a support member and a plurality of protrusions extending away from the support member. At least two protrusions are spaced relative to each other along a longitudinal axis of the interconnect.

27 Claims, 11 Drawing Sheets

(51) Int. Cl.
  *H01G 11/10* (2013.01)
  *H01R 11/01* (2006.01)
  *H01M 10/6551* (2014.01)
  *H01M 10/6561* (2014.01)

(56) References Cited

U.S. PATENT DOCUMENTS

| | | | | |
|---|---|---|---|---|
| 3,877,064 A * | 4/1975 | Scheingold | ......... | H05K 7/1069 |
| | | | | 257/696 |
| 4,932,902 A * | 6/1990 | Crane, Jr. | ............. | H01R 13/26 |
| | | | | 439/627 |
| 6,002,183 A | 12/1999 | Iversen et al. | | |
| 6,003,586 A | 12/1999 | Beane | | |
| 6,186,831 B1 * | 2/2001 | Tsai | ......... | H01R 4/34 |
| | | | | 174/70 B |
| 6,929,504 B2 * | 8/2005 | Ling | ..................... | H01M 2/202 |
| | | | | 361/710 |
| 7,027,290 B1 | 4/2006 | Thrap | | |
| 7,511,942 B2 | 3/2009 | Thrap | | |
| 7,547,233 B2 * | 6/2009 | Inoue | ..................... | H01G 2/04 |
| | | | | 361/328 |
| 7,601,021 B1 * | 10/2009 | Yang | ..................... | G02B 6/0008 |
| | | | | 439/487 |
| 7,764,496 B2 | 7/2010 | Nguyen et al. | | |
| 7,898,078 B1 | 3/2011 | Bernstein et al. | | |
| 7,992,294 B2 | 8/2011 | Zaderej et al. | | |
| 8,574,008 B2 * | 11/2013 | Große | ................... | H01M 2/202 |
| | | | | 439/627 |
| 8,771,862 B2 * | 7/2014 | Kim | ................... | H01M 2/1077 |
| | | | | 429/158 |
| 8,992,268 B2 * | 3/2015 | Casses | ................... | H01M 2/206 |
| | | | | 439/627 |
| 9,246,280 B2 * | 1/2016 | Neer | ................... | G02B 6/4246 |
| 2006/0160422 A1 * | 7/2006 | Bang | ................... | H01M 2/204 |
| | | | | 439/627 |
| 2006/0270277 A1 * | 11/2006 | Zhao | ................... | H01R 43/16 |
| | | | | 439/627 |
| 2005/0292722 | 12/2006 | Becker et al. | | |
| 2009/0154111 A1 | 6/2009 | Lynch | | |
| 2010/0157527 A1 | 6/2010 | Medina | | |
| 2010/0157532 A1 | 6/2010 | Nguyen et al. | | |
| 2010/0265660 A1 | 10/2010 | Nguyen et al. | | |
| 2012/0129030 A1 | 5/2012 | Lim | | |
| 2012/0234519 A1 | 9/2012 | Lee | | |
| 2013/0210269 A1 * | 8/2013 | Neer | ................... | G02B 6/4246 |
| | | | | 439/487 |
| 2013/0260611 A1 * | 10/2013 | Ahn | ................... | H01M 2/1077 |
| | | | | 439/627 |

* cited by examiner

REDUCED TEMPERATURE ENERGY STORAGE DEVICE

CROSS-REFERENCE TO RELATED APPLICATIONS

This Application claims the benefit of U.S. Provisional Application No. 62/145,987, filed Apr. 10, 2015, and entitled "REDUCED TEMPERATURE ENERGY STORAGE DEVICE" and assigned to the assignee hereof. The disclosure of this prior application is considered part of this application, and is hereby incorporated by reference in its entirety.

BACKGROUND

Field of the Invention

The present invention relates generally to energy storage devices, and specifically to energy storage systems with temperature reduction features.

Description of the Related Art

An energy storage system may include a plurality of energy storage cells that are electrically connected in series or parallel. Such a system may operate at increased temperatures, due to increased operating voltages and/or currents provided by the energy storage cells. If the operating temperatures increase above a certain level, a reduction in performance or failure of one or more of the energy storage cells, or the overall energy storage system, may occur.

SUMMARY

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, an energy storage system is disclosed. The energy storage system includes a first energy storage cell, a second energy storage cell, and a first interconnect. The first interconnect is configured to electrically connect the first energy storage cell and the second energy storage cell in series. The interconnect includes a support member configured to extend between the first energy storage cell and the second energy storage cell in a first direction and a plurality of protrusions. The protrusions extend upwardly away from the support member. At least one protrusion extends a height H from the support member and having a width W in the first direction, and a depth D in a second direction orthogonal to the first direction. A ratio of the width W to the depth D is less than or equal to 2:1.

In another aspect, an energy storage system is provided. The energy storage system includes a first energy storage cell, a second energy storage cell, and an interconnect. The interconnect electrically connects the first energy storage cell and the second energy storage cell in series along a longitudinal axis. The interconnect includes a support member, and a plurality of protrusions extending upwardly away from the support member. The plurality of protrusions comprise at least two protrusions spaced relative to each other along the longitudinal axis of the interconnect.

In another aspect, an energy storage system is provided. The energy storage system includes a plurality of energy storage cells, a housing, a plurality of interconnects, and a first and a second channel extending along a common side of the housing. The housing includes an inner volume configured to contain the plurality of energy storage cells. The plurality of interconnects are configured to connect the plurality of energy storage cells in series with respect to each other. The plurality of energy storage cells are contained within the inner volume. The first channel is in fluid communication with a first of the plurality of interconnects, and the second channel is in fluid communication with a second of the plurality of interconnects.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION

Various embodiments of a reduced temperature energy storage system are disclosed. Some embodiments include interconnects configured to electrically connect a first energy storage cell and a second energy storage cell in series. Energy storage cells placed in series or parallel may allow for use with higher currents and/or voltages, generating increasing amounts of heat. As the temperature of the system increases, the performance of the system may decrease. At high temperatures, the system may fail entirely. Accordingly, it may be advantageous to include mechanisms for dissipating heat from the system. Some embodiments of the interconnects described herein include protrusions configured in various ways to provide improved thermal characteristics to the energy storage system. For example, some protrusions provide an increased surface area for allowing for greater heat dissipation. Some protrusions are arranged into a matrix comprising rows and columns, to provide turbulence which may further provide additional cooling. A matrix of protrusions may also allow omnidirectional cooling. For example, a fluid may be flowed across the protrusions in a first direction and also a second direction, wherein the second direction may be at an acute or obtuse (e.g., orthogonal) angle relative to the first direction. Some embodiments of the protrusions herein can provide improved sealing with a cover of the energy storage device, and improved manufacturability. In some embodiments, interconnects configured as described herein may provide improved thermal characteristics to an energy storage system while also providing a decrease in the cost and complexity of the manufacture of the energy storage system. For example, an interconnect may be positioned between two energy storage cells, to provide cooling to both cells, and an electrical connection between, using only a single part.

Some embodiments herein include first and second channels extending along a common side of an energy storage device housing, with each channel in fluid communication with at least one corresponding interconnect. The channels can be configured in various ways to provide improved cooling to each interconnect. The embodiments of the channels described herein can be used separately, or in combination with, the embodiments of the interconnects described herein with various protrusion configurations.

Figure 1:
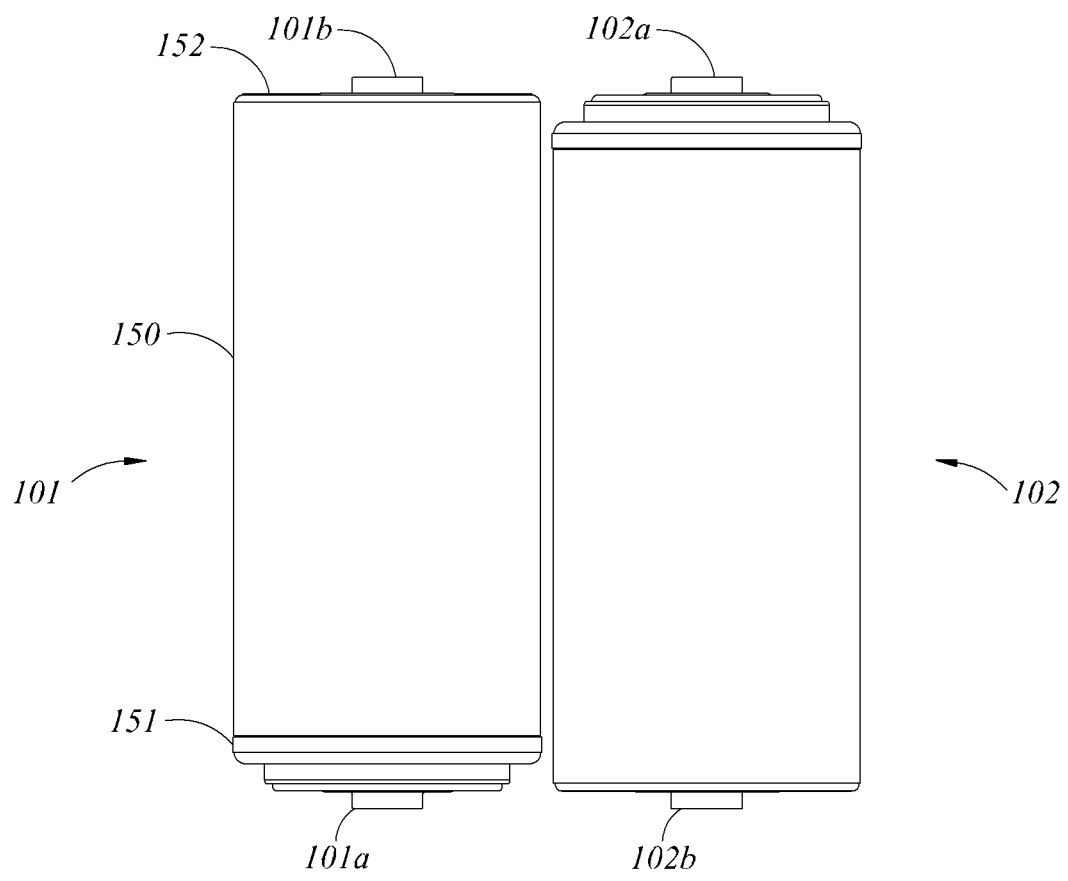
FIG. 1 depicts an embodiment of two energy storage cells.

FIG. 1 depicts an embodiment of a first energy storage cell 101 and a second energy storage cell 102. Features and aspects of first energy storage cell 101 are now discussed in detail; it should be noted, however, that such discussion is also applicable to the other energy storage cells discussed in the present disclosure, for example, second energy storage cell 102. First energy storage cell 101 can include a body 150 which extends between a first end 151 and a second end 152. In some embodiments, body 150 is substantially cylindrically shaped having a longitudinal axis, a substantially circular cross-section extending substantially uniformly along the longitudinal axis, and a length extending between first end 151 and second 152. It will be understood that body 150, may comprise other cross-sectional shapes; for example, in some embodiments, body 150 may comprise a cross section with a substantially square, rectangular, or other polygonal shape, extending uniformly or non-uniformly to form any of a number of different 3-dimensional structures.

First energy cell 101 can comprise a first terminal 101a and a second terminal 101b, with an opposing polarity relative to terminal 101a. In some embodiments, first terminal 101a is disposed on first end 151 and second terminal 101b is disposed on second end 152, although in some embodiments both the first and second terminals 101a, 101b may be disposed on a single end, side, surface, or other portion of first energy cell 101. First and second terminals 101a, 101b may be formed as substantially cylindrical protrusions extending away from first and second end 151, 152 respectively. In general, first and second terminals 101a, 101b can be any of a number of configurations suitable to provide contact points for placing first energy storage cell 101 into electrical contact with an electrical circuit.

First energy storage cell 101 may be an ultracapacitor, capacitor, battery, or any other suitable energy storage cell. Energy storage cell 101 may be any energy storage cell suitable to be placed in series or parallel with one or more additional energy storage cells, such as for example, energy storage cell 102, with terminals 102a, 102b, as described further below.

Figure 2:
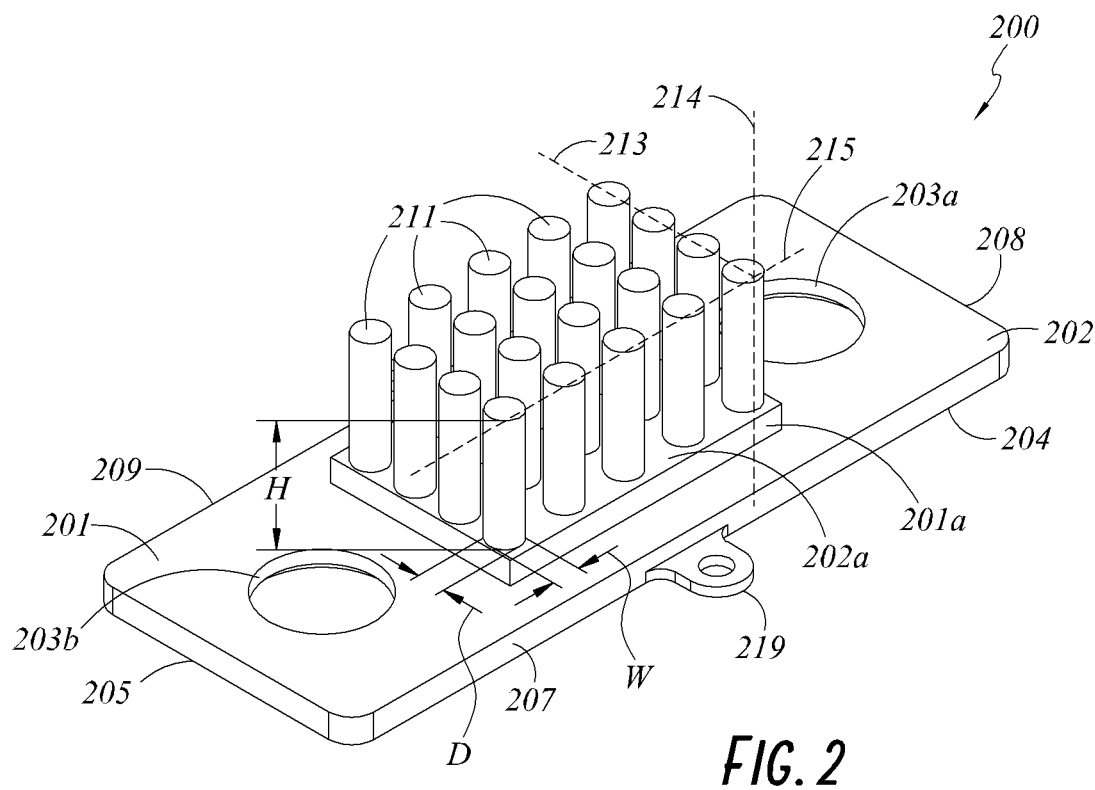
FIG. 2 depicts an embodiment of an interconnect including a plurality of protrusions.

FIG. 2 depicts an embodiment of an interconnect 200. The interconnect 200 can be configured to electrically connect two energy storage cells to each other, as described further herein. Interconnect 200 may include a support member 201, with one or more protrusions 211 extending away from the support member. Protrusions 211 can be configured to cool interconnect 200 and one or more energy storage cells to which interconnect 200 is connected, as described further herein.

The support member 201 can be substantially rectangular, with a top surface 202 and a bottom surface 204, and a thickness measured there between. Support member 201 can comprise a width extending along a longitudinal axis 215, and a depth extending along a transverse axis 213 generally orthogonal to longitudinal axis 215. Support member 201 may further comprise side surfaces 205, 207, 208, 209 as shown. Support member 201 can have a longitudinal width that is greater than its transverse depth, to form a generally elongated shape.

Support member 201 of interconnect 200 may include any structure, such as a first terminal 203a and a second terminal 203b, suitable to provide electrical connectivity between interconnect 200 and one or more energy storage cells. In some embodiments, first and second terminals 203a, 203b may be formed as holes extending through a thickness of support member 201. First and second terminals 203a, 203b may be spaced apart from each other along the longitudinal axis 215. First terminal 203a of interconnect 200 may be configured to electrically connect with the first terminal 101a of first energy storage cell 101, and second terminal 203b of interconnect 200 may be configured to electrically connect with the second terminal 102b of second energy storage cell 102 (FIG. 1). For example, first terminal 101a of energy storage cell 101 may comprise a protrusion extending from first end 151 configured to be received within an opening formed by first terminal 203a, forming an electrical connection between first energy cell 101 and interconnect 200.

In some embodiments, first and second terminals 203a, 203b of interconnect 200 may comprise holes which extend only partway through the thickness of support member 201, wherein the holes are open to bottom surface 204 of support member 201 (not shown). In another embodiment, first and second terminals 203a, 203b of interconnect 200 may comprise protrusions extending from bottom surface 204 of support member 201 (not shown). In another embodiment, first and second terminals 203a, 203b of interconnect 200 may comprise protrusions extending from or indentations in side surfaces 205, 208 of support member 201 (not shown). In yet another embodiment, interconnect 200 may include terminals that do not have protrusions, openings, or other structure configured to specifically receive or be received by corresponding features on an energy storage cell. For example, a portion of bottom surface 204 of support member 201 might simply form terminal 203a by merely contacting first terminal 101a of first energy storage cell 101, without requiring any specific structure distinguishable from the other portions of bottom surface 204. Such an embodiment may be electrically connected to a corresponding terminal on an energy storage cell, for example, by welding or direct surface contact.

Interconnect 200 may also include one or more tabs 219 extending from any of side surfaces 205, 207, 208, 209. Tab 219 may optionally include a hole extending through a thickness thereof. In some embodiments, tabs 219 provide electrical connection points for each interconnect 200. The connection points may be used to interface each interconnect 200 with a voltage and/or temperature detection system. In some embodiments, a wiring harness electrically connects each interconnect 200, via tab 219, to a cell management system that is configured to monitor the energy storage system. The tab 219 can also be used as a temperature sensor connection point on some bus bars.

Protrusion 211 can extend generally upward and away from a portion of support member 201, such as top surface 202. Protrusion 211 may extend from the support member 201 by a height H, measured along an axis 214 extending from (e.g., normal to) top surface 202; a depth D, measured along transverse axis 213, or a line approximately parallel with axis 213; and a width W, measured along a longitudinal axis 215, or a line generally parallel with axis 215.

In some embodiments, including the embodiment of FIG. 2, protrusion 211 is substantially cylindrical in shape, wherein the height of the protrusion is equal to the length of the cylinder and the width and depth of the protrusion 211 are each a diameter of the cylinder. In such an embodiment, a cross-sectional shape of protrusion 211 when viewed along axis 214 (e.g., taken along a plane parallel to top surface 202) is a circle. It will be noted, however, that other cross-sectional shapes are contemplated for protrusion 211 and within the scope of this disclosure. For example, protrusion 211 may have a triangular, square, rectangular, other polygonal or oval cross-section. In addition, any protrusion 211 can have the same or different dimensions, or cross-sectional shapes, relative to any other protrusion 211. Protrusion 211 can have a substantially uniform or varying cross-sectional shape along axis 213, 214, and/or 215.

In some embodiments, interconnect 200 may include a plurality of protrusions 211, with various configurations to improve cooling to interconnect 200 and one or more attached energy storage cells. For example, interconnect 200 can include at least two protrusions spaced relative to each other along the longitudinal axis 215, to allow the protrusions to receive the benefit of cooling fluid flow that travels both in the direction of axis 215, and axis 213. Such omnidirectional cooling is an improvement over unidirectional cooling that is achieved, for example, with one or more elongated ribs that are spaced across the depth (axis 213) of an interconnect, but extend across the entirety of the width of interconnect 200 (axis 215). Different quantities of protrusions can be employed; in the embodiment presented in FIG. 2, interconnect 200 includes 20 protrusions 211 for illustrative purposes only.

The protrusions may be arranged in a matrix comprising a series of rows and columns, to provide additional cooling benefits. In FIG. 2, interconnect 200 includes four rows, each row including five protrusions aligned along longitudinal axis 215. Interconnect 200 also includes five columns, each column including four protrusions 211 aligned along transverse axis 213. The example provided in FIG. 2 and described here is merely one possible embodiment, and it will be understood by those of skill in the art that other numbers of protrusions, rows, and columns, and the relative positioning thereof, may be used according to the principles herein disclosed. For example, the individual protrusions, rows and columns, and overall matrix formed therefrom, can be positioned in various ways relative to each other on the support portion of the interconnect. It will also be appreciated that in some embodiments, each successive row may be laterally offset from the preceding row in a longitudinal direction. Similarly, in some embodiments, each successive column may be laterally offset from the preceding column along a transverse direction. In some embodiments, the rows and columns of a matrix of protrusions 211 may not be aligned with the longitudinal and/or transverse directions of the interconnect 200. In some embodiments, the spacing between protrusions 211 in either a row or a column need not be uniform. In some embodiments, the rows and/or columns may not be linear. For example, in some embodiments, the protrusions 211 may be spaced, evenly or unevenly, along a curved path. In some embodiments, the protrusions are arranged to increase the turbulence of a coolant flowed there through, for example, where the protrusions are arranged in an irregular matrix, or where the rows and/or columns of protrusions are offset relative to each successive row or column.

The cooling benefits provided by protrusions 211 can also be varied, by adjusting the ratio of the width W to depth D of the protrusions 211. For example, if the width W to depth D ratio of a protrusion is below a certain amount, this can allow two or more protrusions 211 to be spaced along axis 215 that might not otherwise fit for an interconnect 200 of a given width. Such two or more spaced protrusions allow for omnidirectional cooling fluid to flow over and between the protrusions 211 both in the direction of axis 215, and in the direction of axis 213, as described above. Thus, a ratio of depth D to width W below a certain amount allows for omnidirectional cooling between a plurality of protrusions 211. A fin, which would have a greater width W to depth D ratio, and extend along axis 215 for substantially the entire width of interconnect 200 (not shown), would merely provide unidirectional cooling flow along axis 215. To provide the aforementioned omnidirectional cooling flow, in some embodiments, the ratio of the width W to the depth D is less than or equal to 2:1. In some embodiments, the ratio of the width W to the depth D is less than or equal to 1.5:1. In some embodiments, the ratio of the width W to the depth D is approximately 1:1. In some embodiments, the ratio of the depth D to the width W is less than or equal to 2:1. In some embodiments, the ratio of the depth D to the width W is less than or equal to 1.5:1. Accordingly, in some embodiments, the ratio of the width W to the depth D is between 2:1 and 0.5:1. In some embodiments, the width W and the depth D are approximately the same. In some embodiments, the width W and depth D are based upon a common radius of the protrusion, such that the protrusion has an approximately circular cross-sectional shape.

Interconnect 200, including an arrangement of protrusions 211 as discussed above, provides a mechanism for improved heat dissipation. Protrusions 211 arranged in a matrix allow for omni-directional cooling. A coolant may be flowed through the protrusions in more than one direction increasing the ability of interconnect 200 to dissipate heat through convection. Further, a matrix of protrusions 211 increases the surface area from which heat can be transferred, again improving the ability of the interconnect 200 to dissipate heat. Finally, a matrix of protrusions 211 may also be configured to increase the turbulence of a coolant flowing there through, further improving the ability of the interconnect 200 to dissipate heat. It will be understood that protrusions with any of a number of different shapes, heights, spacing, and positioning can be employed for improved temperature transfer.

Interconnect 200 may comprise, wholly or in part, a material that is both electrically and thermally conductive. In one embodiment, interconnect 200 is made from aluminum. In some embodiments, at least a portion of support member 201 and protrusions 211 may be made from a material this both electrically and thermally conductive. Support member 201 and protrusions 211 may be made from a different material or similar material with respect to each other.

Interconnect 200 may be formed as a single unitary part through casting, molding, printing, or other suitable manufacturing process. Or, in other embodiments, interconnect 200 may be formed in discrete parts that are then assembled to form interconnect 200. For example, support member 201 and protrusions 211 can each be formed by extrusion as discrete parts. Support member 201 and protrusions 211 can then be joined by any suitable process or method, including laser welding or adhesive.

The matrix of protrusions 211 can be disposed on support member 201 in different ways. For example, a center point of the matrix of protrusions 211 can be aligned, or offset, with respect to a center point for support member 201. In other words, the matrix of protrusions 211 can be centered on support member 201 between side portions 205, 208 of support member 201 or between terminals 203a, 203b.

In some embodiments, interconnect 200 may include more than two terminals with a one or more protrusions 211 extending upward from support member 201 between each terminal. For example, an interconnect may include three terminals with two groups of one or more protrusions between each terminal.

In some embodiments, protrusions 211 may be attached to a portion of support member 201 at a different elevation (above or below) relative to other portions of support member 201. For example, support member 201 can include a protrusion base 201a configured to attach protrusions 211 to support member 201 at a higher elevation than terminals 203a, 203b, and or side surfaces 205, 207, 208, and/or 209 of support member 201. The portion of support member 201 that forms protrusion base 201a may extend upward from top surface 202 to form an elevated portion 202a of top surface 202 from which protrusions 211 can extend.

Figure 2A:
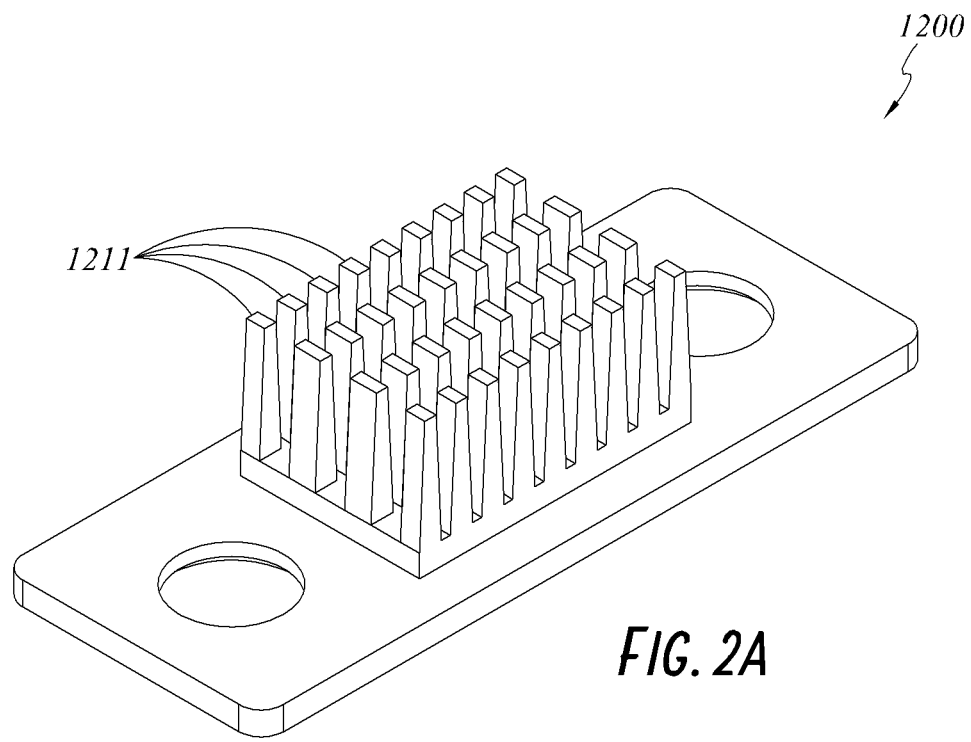
FIG. 2A depicts another embodiment of an interconnect including a plurality of protrusions.

FIG. 2A depicts an embodiment of an interconnect 1200. Interconnect 1200 can be similar to interconnect 200 in FIG. 2. Interconnect 1200 can include protrusions 1211 with a cross-sectional shape that has one or more straight or flat portions, for example, four flat sides to form a substantially square or rectangular cross-section as shown. Protrusions 1211 can have a cross sectional area which changes (e.g., decreases) in size from their base (on the support member) to their ends, for example, to form a tapered shape along its height H. A tapered shape can allow for reduced materials costs, due to inefficiencies at the ends of the protrusions.

Figure 3:
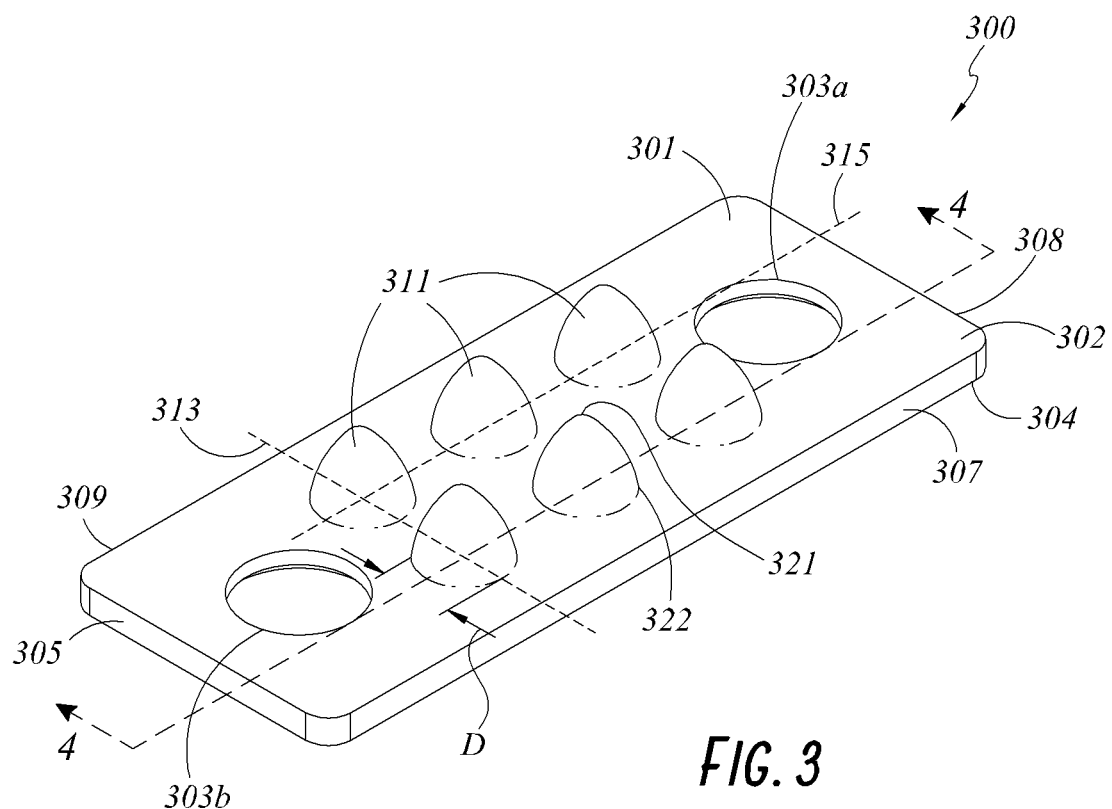
FIG. 3 depicts an embodiment of an interconnect including a plurality of protrusions.

FIG. 3 depicts another embodiment of an interconnect 300 that may be manufactured as a unitary piece out of a thermally and electrically conductive material. Interconnect 300 includes a support member 301 having a top surface 302 and a bottom surface 304, as well as a plurality of side surfaces 305, 307, 308, 309. Support member 301 may comprise overall dimensions and shape similar to support member 201 described above. Interconnect 300 may also include a first terminal 303a and a second terminal 303b each comprising features substantially similar to the first and second terminals 203a, 203b described above with reference to interconnect 200.

Interconnect 300 may also include at least one protrusion 311 extending substantially upward from top surface 302. The at least one protrusion 311 can be substantially similar in form and function to protrusion(s) 211, as described above with reference to interconnect 200. For example, in some embodiments, interconnect 300 includes a plurality of protrusions 311 arranged into a matrix comprising rows and columns of protrusions 311. The embodiment of FIG. 3, which merely provides one possible example of such an arrangement, shows a matrix comprising six protrusions 311. The matrix includes two rows, each row comprising three protrusions 311 spaced along or in a direction parallel to a longitudinal axis 313, and three columns, each column including two protrusions spaced along or in a direction parallel to transverse axis 313. As above, however, other numbers of protrusions 311 and their arrangement into rows and columns will be understood to be within the scope of the present disclosure.

Figure 4:
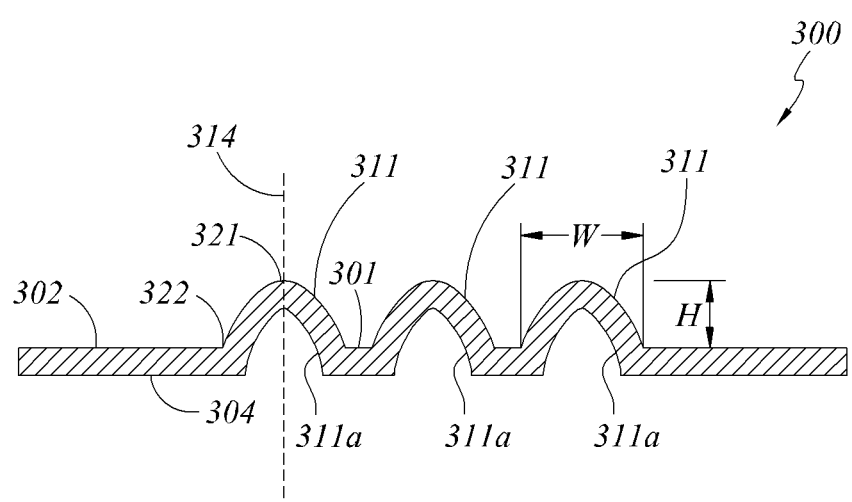
FIG. 4 depicts a cross-section view of the interconnect shown in FIG. 3.

FIG. 4 provides a cross-sectional view of interconnect 300 taken along the line A-A in FIG. 3. As depicted in FIG. 4, each protrusion 311 extends upward from upper surface 302 of support member 301. Referring to FIGS. 3 and 4, protrusion 311 may comprise a height H and a width W defined with respect to axes 314 and 315, respectively, similar to these dimensions as defined with respect to protrusion 211 and axes 214 and 215 (FIG. 2). Protrusion 311 may also comprise a depth D (FIG. 3) defined with respect to axis 313, similar to that defined with respect to protrusion 211 and axis 213 (FIG. 2).

Protrusion 311 may have different shapes. Protrusion 311 may decrease in cross sectional area, for example, from a wider portion at a base 322 of protrusion 321 to a narrower portion tip 321. Protrusion 311 can be an approximately semi-spherical, frusto-pyramidal, or frusto-conical shape.

In some embodiments, the ratios between the depth D and width W can be similar to those described above with regards to interconnect 200. In some embodiments, the ratio of the height H to at least one of the depth or the width is less than or equal to 2:1. Reducing the ratio of the height H to the depth D and/or width W can allow the protrusions 311 and support member 301 to be more easily formed as an integrated or unitary construction, for example, by a stamping process. If the ratio of the H to the either the depth D or width W exceeds 2:1, the cost of manufacture of interconnect 300 will increase as more expensive manufacturing methods, such as press-forming may be required.

As depicted in the cross-sectional view of FIG. 4, each upwardly extending protrusion 311 may include a corresponding recess or dimple 311a. These features may result from the manufacturing processes by which interconnect 300 can be made. In some embodiments, interconnect 300 is formed by stamping, pressing, or forging a sheet of metal over a form that includes protrusions. As the sheet metal is pressed over the form, it takes the shape of the form. In this way, protrusions 311 and corresponding dimples 311a may be formed at the same time as the support 301 and interconnect 300 may be made as a unitary piece using relatively simple manufacturing processes, and in some embodiments, in a single manufacturing step.

Figure 5:
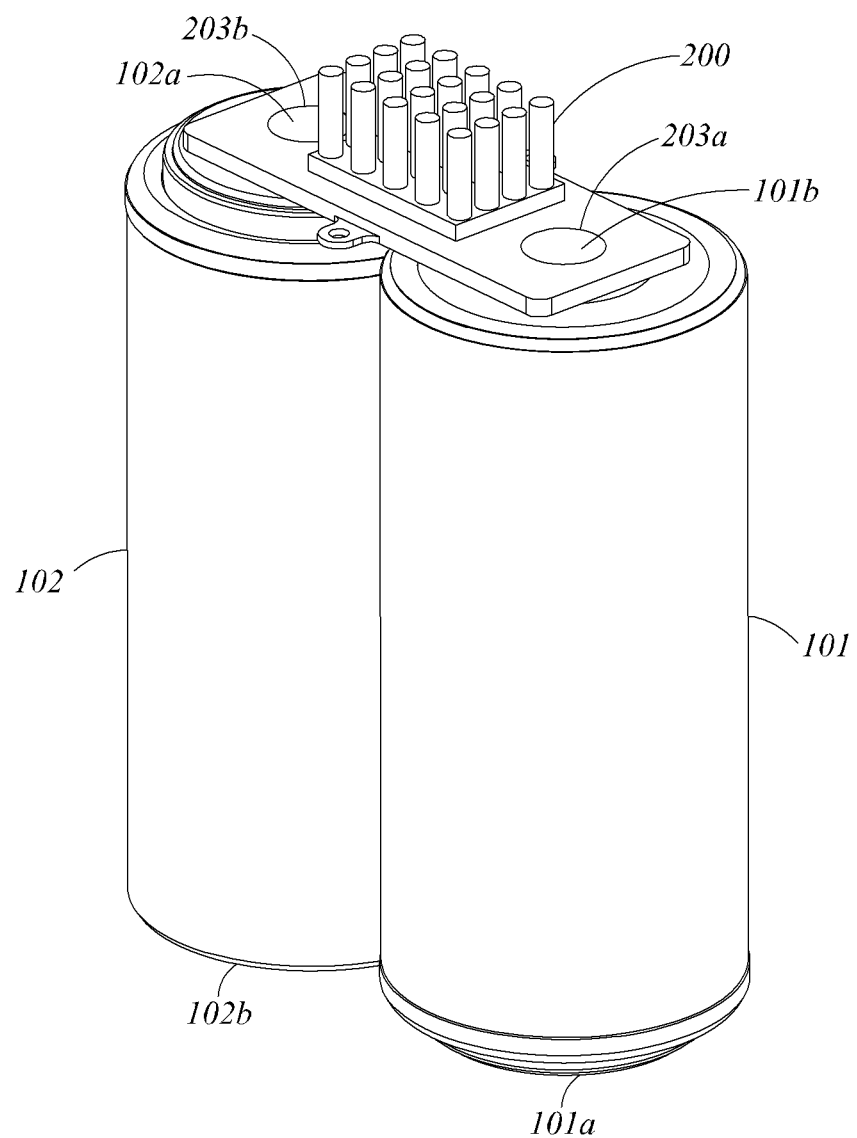
FIG. 5 shows how an interconnect can be used to place two energy storage cells in series.

FIG. 5 depicts an embodiment of the first energy storage cell 101 connected, for example, in series with a second energy storage cell 102, with interconnect 200. First energy storage cell 101 can be placed adjacent to and connected with second energy storage cell 102, although an interconnect with similar features and functionality as those described herein could be employed to connect non-adjacent cells. First energy storage cell 101 is positioned with its first terminal 101a facing down and its second terminal 101b facing up. Second energy storage cell 102 is positioned with the opposite orientation: first terminal 102a is facing up and second terminal 102b is facing down.

Interconnect 200 is then placed across the first and second energy storage cells 101, 102, so that first terminal 203a of interconnect 200 contacts second terminal 101b of first energy storage cell 101 and second terminal 203b of interconnect 200 contacts first terminal 102a of second energy storage cell 102. Interconnect 200 establishes an electrical connection between second terminal 101b and first terminal 102a, placing the first and second energy storage cells in series. It will be understood that interconnect 200, and cells 101, 102 can be configured and positioned to connect cells 101 and 102 in parallel.

Figure 6:
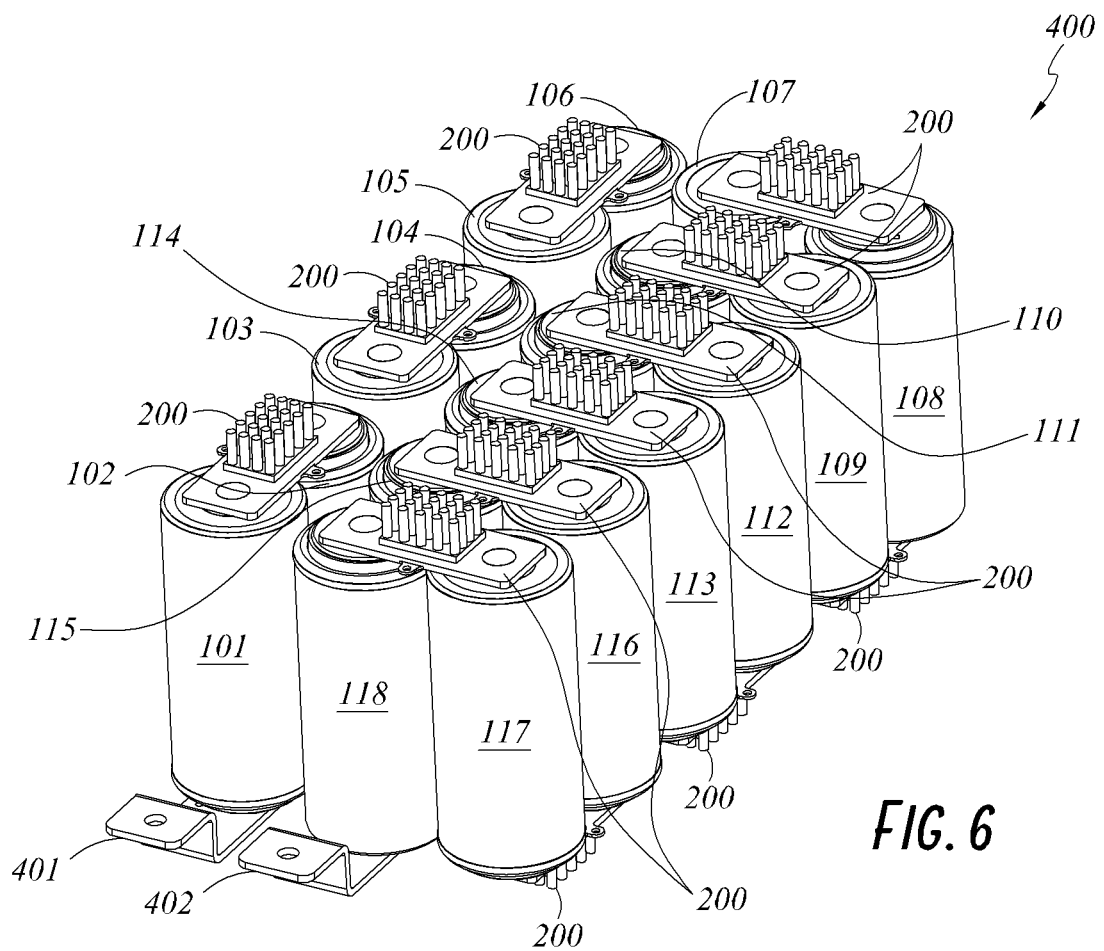
FIG. 6 depicts a perspective view of an energy storage system including eighteen energy storage cells connected in series using interconnects.
Figure 7:
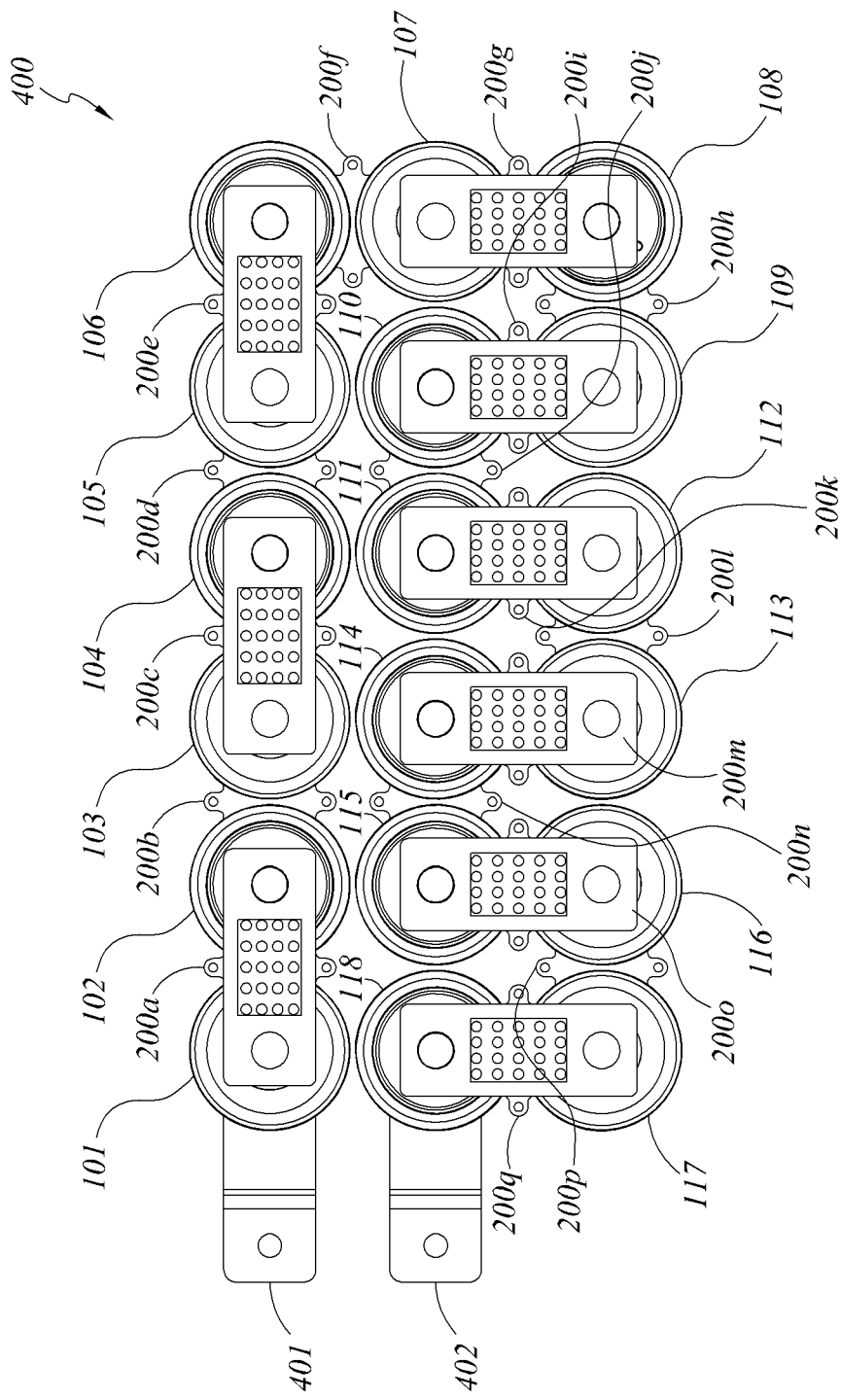
FIG. 7 shows a top view of the energy storage system of FIG. 6.

FIG. 6 shows a perspective view of an embodiment of an energy storage system 400. Energy storage system 400 is shown with 18 energy storage cells 101-118 for illustrative purposes. FIG. 7 shows a top view of the energy storage system 400 of FIG. 6. Energy storage cells 101-118 are positioned within a matrix of three rows and six columns as shown.

The energy storage cells 101-118 can be placed in series using interconnects 200a-200q. This is accomplished by first reversing the orientation of, and thus, the polarity of, the terminals of each successive energy storage cell; in other words, placing each of the odd numbered energy storage cells in one orientation, and placing each of the even numbered energy storage cells in the opposite orientation. Thus, energy storage cell 101 is oriented with its first terminal 101a facing down and its second terminal 101b facing up, energy storage cell 102 is oriented with its first terminal 102a facing up and its second terminal 102b facing down, energy storage cell 103 is oriented with its first terminal 103a facing down and its second terminal 103b facing up, and so on.

Next, interconnects 200 are used to place energy storage cells 101-118 in series. In FIG. 7, each successive interconnect in the series is indicated by appending a letter to its reference numeral, for example, interconnect 200a, interconnect 200b, and so on. Interconnect 200a is placed between second terminal 101b of energy storage cell 101 and first terminal 102a of energy storage cell 102. Interconnect 200b is placed between second terminal 102b of energy storage cell 102 and first terminal 103a of energy storage cell 103. It should be noted that interconnects 200a and 200b are positioned on opposite sides of the group of energy storage cells with respect to each other. As shown in FIG. 7, interconnect 200a is positioned on top of the group of energy storage cells and interconnect 200b is positioned on the bottom of the group of energy storage cells. Interconnect 200c is placed between second terminal 103b of energy storage cell 103 and first terminal 104a of energy storage cell 104. This pattern continues until each of the energy storage cells 101-118 has been connected in series using interconnects 200a-200q.

In some embodiments, a first electrode 401 is connected to the first terminal 101a of energy storage cell 101 and a second electrode 402 is connected to the second terminal 118b of energy storage cell 118. First and second electrodes provide connection points for making electrical connections with the overall energy storage system 400. Thus, electrodes 401 and 402 form energy storage system terminals to connect the energy storage system 400 to an external system.

Figure 8:
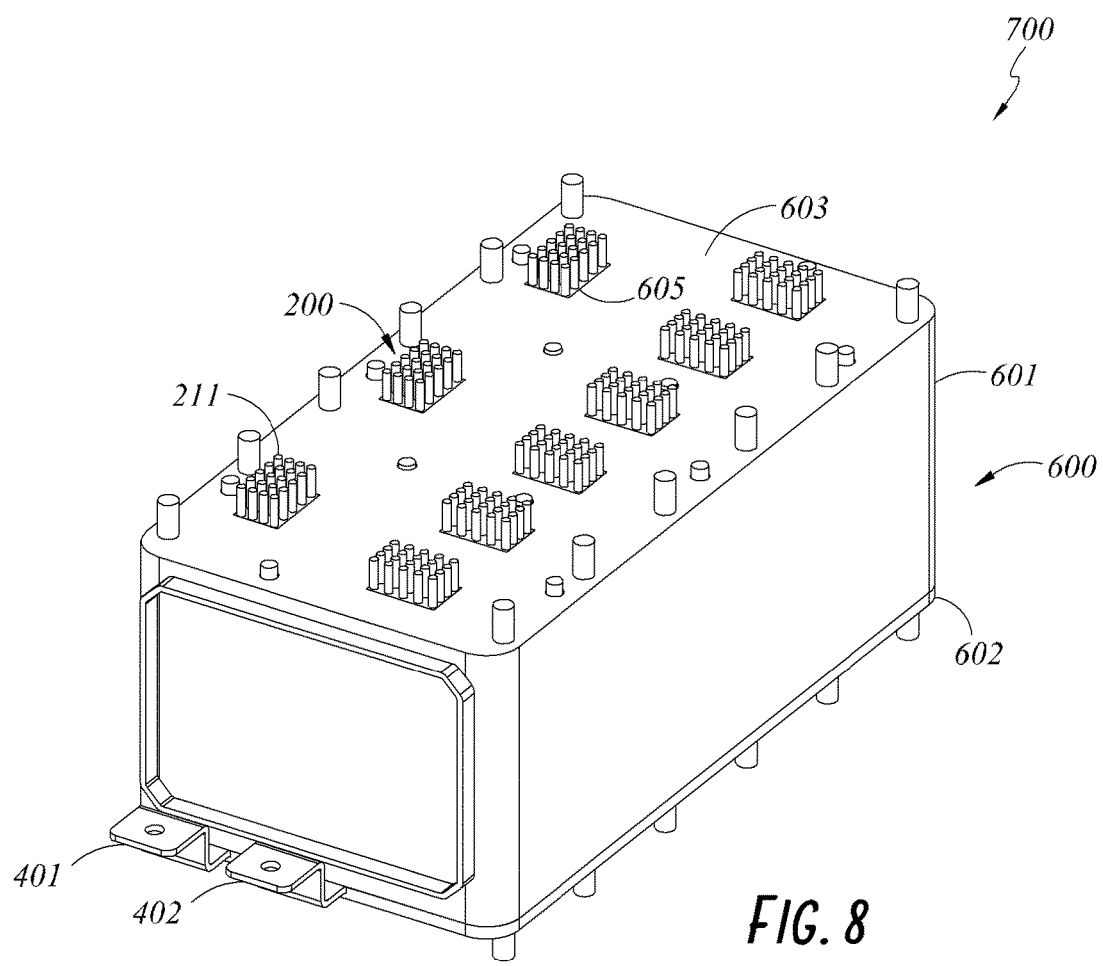
FIG. 8 depicts an embodiment of an energy storage system including a cover.
Figure 9:
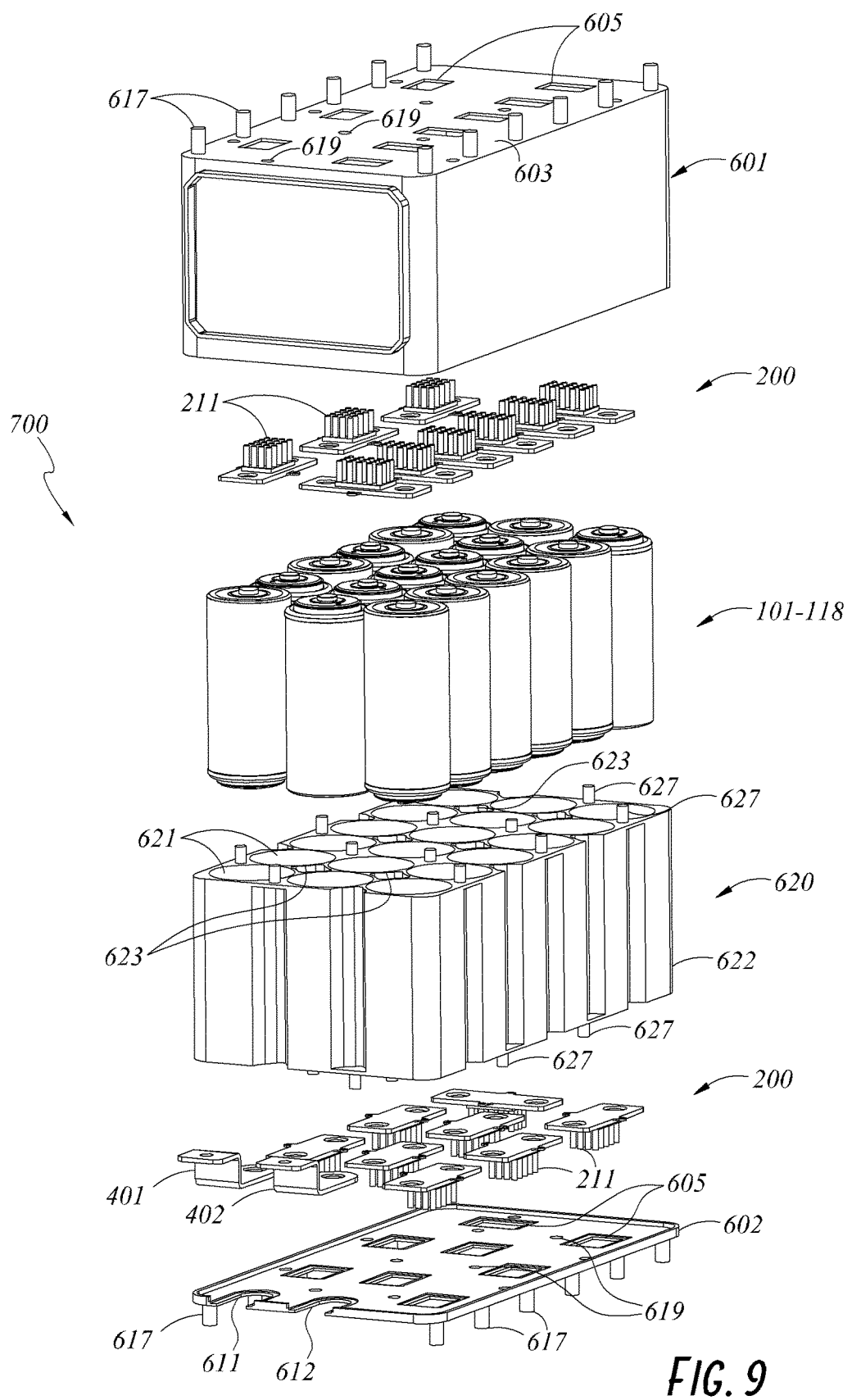
FIG. 9 shows an exploded perspective view of an energy storage system.

FIG. 8 shows a perspective view of an embodiment of an energy storage system 700. FIG. 9 shows an exploded view of the energy storage system 700. Energy storage system 700 can be similar to energy storage system 400 (FIGS. 6 and 7). In some embodiments, the energy storage system 700 can include a cover 600 configured to cover two or more of the energy storage cells. Cover 600 can form a housing for energy storage cells 101-118, yielding a reduced temperature energy storage device.

Cover 600 can include one or more apertures 605 extending into a top surface 603 of cover 600, and through its thickness. Apertures 605 can be configured to receive a portion of a corresponding interconnect 200. For example, aperture 605 can be configured to allow protrusions 211 to be extended through a thickness of cover 600. Aperture 605 can be configured to seal with a portion of a corresponding interconnect 200. First and second electrodes 401, 402 can also extend through cover 600, providing external electrical mounting points, for example, through apertures 611 and 612, respectively, extending through portions of cover 600. Cover 600 may include a top portion 601 and a base portion 602. A bottom edge of top portion 601 may be configured to engage with a portion of base 602 to hold the two pieces together, forming cover 600.

In some embodiments, cover 600 may be made from plastic or any other suitable non-electrically conducting material. It may be formed through injection molding, or any other suitable manufacturing process. Cover 600 may also include one or more pegs 617 extending from top and/or bottom surfaces of cover 600. In some embodiments, cover 600 also includes one or more holes 619 extending through top and/or bottom surfaces of cover 600. Use of the pegs 617 and holes 619 will be discussed below.

A first layer of interconnects 200 is disposed above energy storage cells 101-118, wherein the protrusions 211 of interconnects 200 are oriented to extend away from the energy storage cells and through the apertures 605. A second layer of interconnects 200 is disposed below the energy storage cells 101-118, wherein the protrusions 211 are oriented to extend away from the energy storage cells and in an opposite direction than the protrusions 211 of the first layer.

Energy storage system 700 may have improved thermal characteristics over other energy storage systems because protrusions 211 of interconnects 200 extend through cover 600. The protrusions 211 may provide heat dissipation mechanisms for the system according to the principles discussed above. In some embodiments, a fluid may be flowed over each side of energy storage system 700 through which protrusions 211 extend, further improving the system's ability to dissipate heat. Accordingly, energy storage system 700 may be able to operate at higher voltages and/or currents than other energy storage systems that do not include protrusions extending through a cover of the system.

FIG. 9 also shows an embodiment of a support structure 620 that may be included in some embodiments of reduced temperature energy storage device 700. Support structure 620 may be formed from a unitary body 622 of thermally conductive, electrically nonconductive material and may comprise a plurality of bays 621 and channels 623.

Bays 621 may be formed as holes extending entirely through body 622. Each of bays 621 may be configured in size and shape to receive an energy storage cell into each bay 621. Thus, bays 621 may be positioned into a series of rows and columns as described above. Channels 623 may also be formed as holes extending through body 622. Channels 623 may be disposed between at least some of bays 621 and may reduce the weight of support structure 620 and/or provide improved thermal characteristics for energy storage device 700.

One or more pegs 627 may extend away from top and or bottom surfaces of body 622. The pegs are configured in size and shape to extend into holes 619 of cover 600. The pegs may be used to correctly position support structure 622 and energy storage cells 101-118 placed into bays 621 within cover 600.

Figure 10:
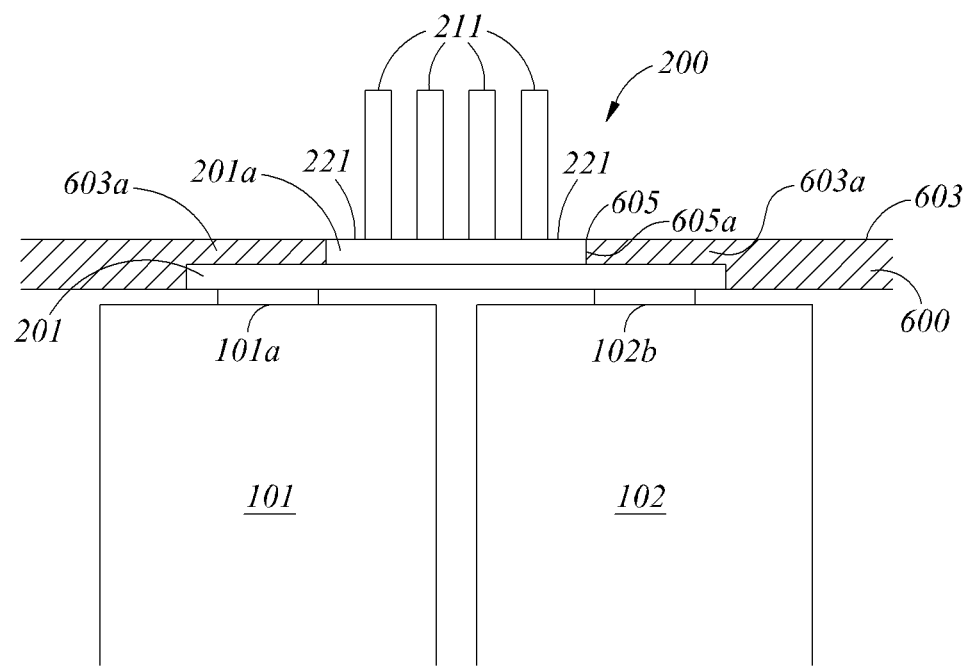
FIG. 10 depicts a cross-section view of a portion of an energy storage system that shows an embodiment of how an interconnect may engage with a cover.

FIG. 10 shows a cross-sectional view that illustrates an embodiment of cover 600 engaging with interconnect 200 when assembled. First energy cell 101 is shown disposed adjacent to second energy cell 102. Interconnect 200 extends between first terminal 101a and second terminal 102b. A portion of cover 600 is shown covering first and second energy storage cells 101, 102. A portion of interconnect 200 extends through aperture 605 and through the thickness of cover 600. Interconnect 200 can extend through aperture 605 sufficiently to a point that protrusions 211 are external to cover 600.

Aperture 605 can form an inner facing perimeter 605a configured to engage with an outer facing perimeter of support member 201, such as an outer facing perimeter of protrusion base 201a, and/or an outer facing perimeter formed by sides 205, 207-209 (FIG. 2). Aperture 605 can comprise a step shape, so that a portion 603a of cover 600 extends substantially over a portion of support member 201, such as sides 205, 207-209 (see also FIG. 2). Protrusion base 201a of interconnect 200 can continue upward through the aperture 605 so that protrusions 211, mounted on protrusion base 201a, extend away from top surface 603 and external to cover 603. This embodiment of aperture 605 may help to orient and stabilize interconnect 200 relative to cover 600 and first and second energy storage cells 101, 102. Such lateral or longitudinal stabilization can reduce the likelihood of failure of the electrical connection between interconnect 200 and cells 101 and 102.

Figure 11:
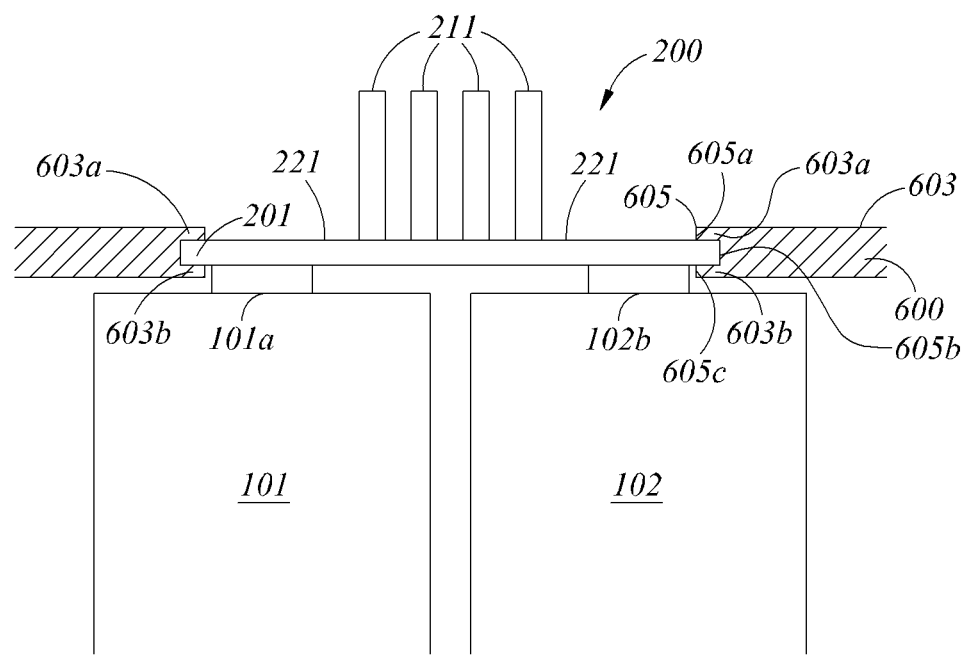
FIG. 11 depicts a cross-section view of a portion of an energy storage system that shows an additional embodiment of how an interconnect may engage with a cover.

FIG. 11 also shows a cross-sectional view that illustrates an embodiment of cover 600 engaging with interconnect 200 when assembled. In some embodiments, support member 201 of interconnect 200 can be secured at aperture 605. Aperture 605 can comprise a first inner facing perimeter portion 605a, a second inner facing perimeter portion 605b, and a third inner facing perimeter portion 605c. Here, an outer facing perimeter of the support member 201, such as a perimeter formed by sides 205, 207-209 (see FIG. 2), extends laterally past the first inner facing perimeter portion 605a and third inner facing perimeter portion 605c, and engages with the second inner facing perimeter portion 605b.

Aperture 605 may be formed with a substantially C-shaped cross-section extending around its perimeter as shown. A first portion 603a extends over and covers a portion of a top surface of support member 201 and a second portion 603b extends over and covers a portion of a bottom surface of support member 201. This embodiment of aperture 605 may also help to orient and stabilize interconnect 200 relative to cover 600. Further, when assembled in this manner, interconnects 200 can be essentially integrated in to cover 600, for example, by molding separate interconnect pieces into a cover. This may allow for greater ease of assembly and easily interchangeable covers. Additionally, if interconnect 200 includes first and second terminals 203a, 203b as shown, for example, in FIG. 2, additional orientation and stabilization of first and second energy storage cells 101, 102 relative to cover 600 can be provided.

Continuing to refer to FIGS. 10 and 11, interconnect 200 may be formed so that a gap 221 exists between each of protrusions 211 and cover 600. In some embodiments, the gap is 0.5 millimeters. However, it will be understood by one of skill in the art other gap dimensions may be used. The gap 221 allows protrusions 211 to be more easily inserted through aperture 605 in cover 600, and prevents interference in sealing interconnect 200 with cover 600. The embodiments of the protrusions described herein thus provide these insertion and sealing benefits which would not be provided in interconnects that include elongated ribs that extend the entire length of the interconnect, and thus interfere with both insertion through a cover, and sealing with a cover.

Figure 12:
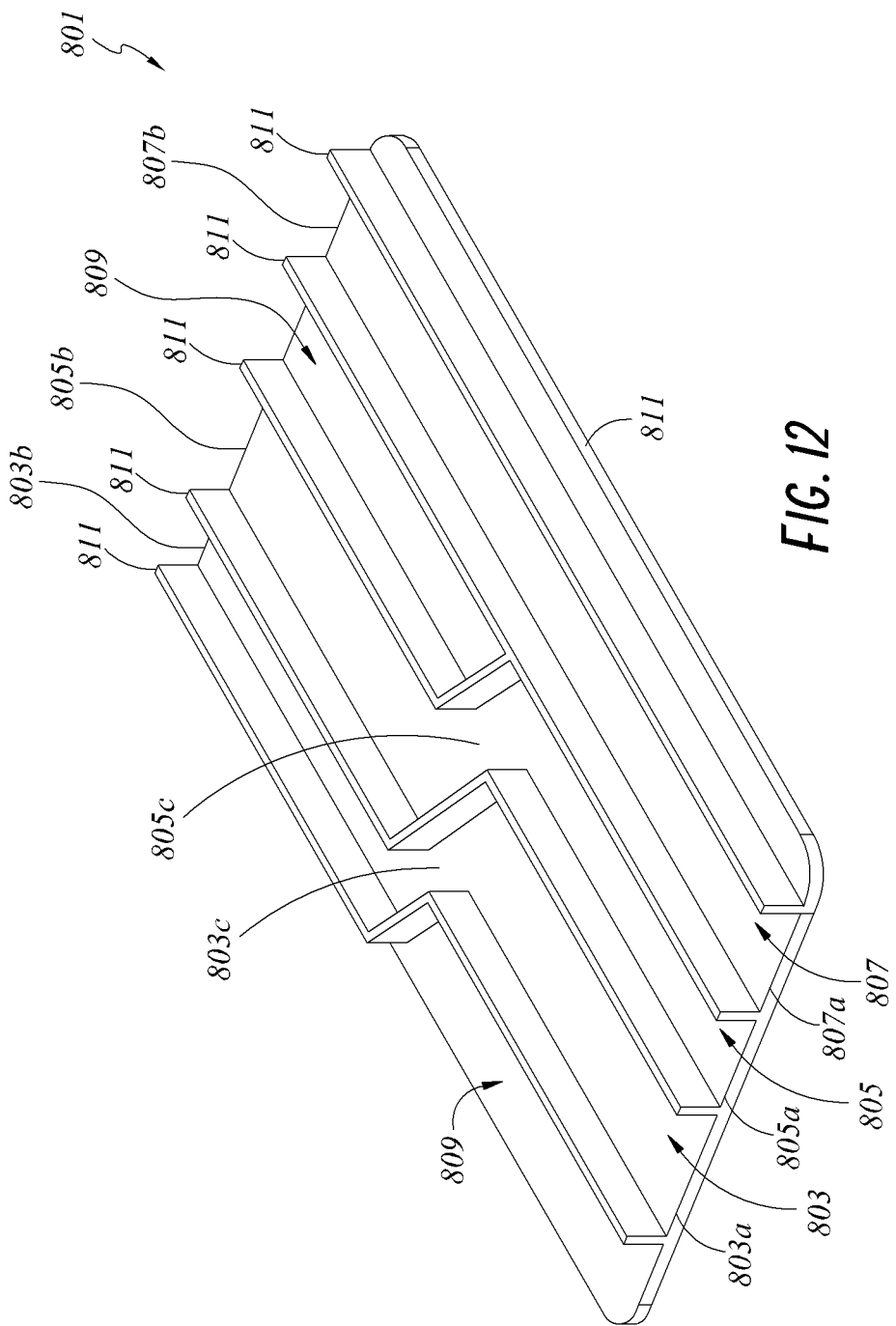
FIG. 12 depicts a perspective view of a channel cover.
Figure 13:
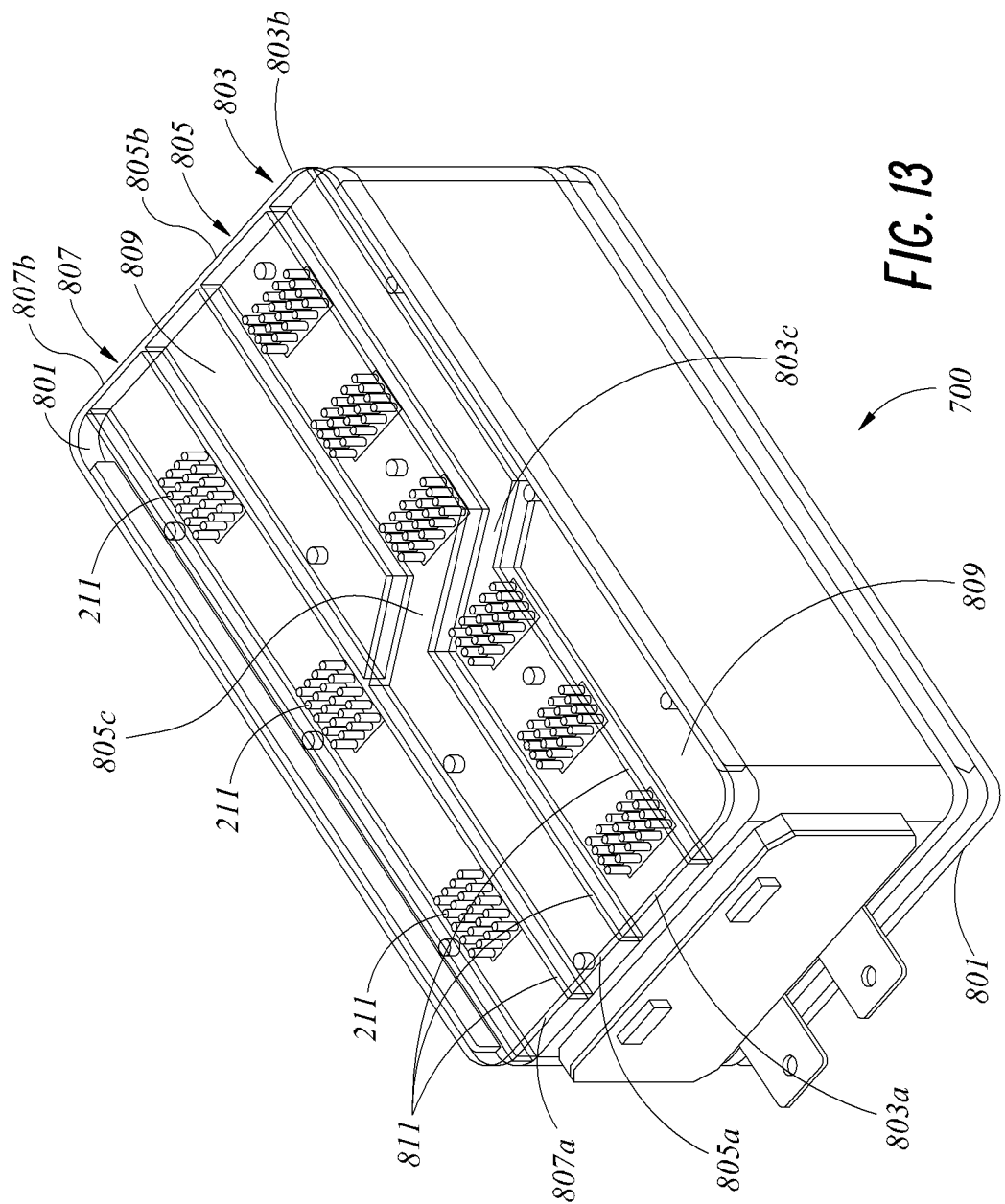
FIG. 13 depicts a perspective view of an energy storage system with interconnect temperature control channels.

FIG. 12 shows an embodiment of a channel cover 801 that may be used with some embodiments of a reduced temperature energy storage system. FIG. 13 depicts an embodiment of an energy storage system 700 with two channel covers 801 configured to form interconnect temperature control channels. FIG. 13 is shown with the channel cover 801 implemented with an energy storage system that has interconnects with protrusions similar to those shown for system 700 shown in FIGS. 8 and 9. Channel cover 801 shown in FIG. 12 is inverted relative to the orientation shown in FIG. 13, and it is noted that the channel cover 801 in FIG. 13 is shown transparent in FIG. 12, so as to be able to view the internal features. The channel cover 801 can be a transparent, translucent, or opaque material. It will be understood that the channel cover and its features described herein can be employed with other types of interconnects that have other types of cooling fins or features, and should not be limited to those with the protrusions described herein.

Referring to FIGS. 12 and 13, the channel cover 801 may comprise a substrate 802 from which one or more dividers 811 extend. Dividers 811 extend generally upward from substrate 802 and may comprise a height measured from the substrate 802 along a line normal to the substrate 802. In some embodiments, the height of dividers 811 is at least the height of protrusions.

Dividers 811 may be arranged on substrate 802 to form one or more channels. Dividers 811 may form open channels, or preferably closed channels, when a lid or other additional cover is placed over the channel cover 801 and dividers 811. In the embodiment of FIG. 12, three channels 803, 805, 807 are shown. Channel 803 comprises a first end 803a that forms a channel inlet and a second end 803b that forms a channel outlet. Channel 805 comprises a first end 805a (inlet) and a second end 805 (outlet). Channel 807 comprises a first end 807a (inlet) and a second end 807b (outlet). Each channel comprises a substantially rectangular cross-section formed by substrate 802, two dividers 811, and a line connecting the top of the two dividers, although any suitable cross-sectional shape can be employed. In some embodiments, the cross-section of a channel may change from its first end to its second end, by including a tapered portion. For example, as seen in FIG. 12, first end 803a of channel 803 has a larger rectangular cross-section than second end 803b. First end 805a has a smaller rectangular cross-section than second end 805b. In other embodiments, a channel may maintain an approximately constant cross-section from its first end to its second end. For example, channel 807 maintains the same rectangular cross-section from its first end 807a to its second end 807b. Channel cover 801 may further comprise one or more empty volumes 809 that are do not form part of any channel.

In some embodiments, the dividers 811 forming certain channels may be configured so that the channels they form include bend portions. For example, in FIG. 14, channel 803 includes bend portion 803c and channel 805 includes bend portion 805c. In some embodiments, channels may include more than one bend portion, while in other embodiments, channels may include no bend portions, for example channel 807. The principles that guide the arrangement of dividers 811, channels 803, 805, 807, bend portions 803c, 805c, and empty volumes 809 will be discussed in greater detail below.

It should be noted that one channel cover 801 is installed on each of the top and bottom sides of energy storage system 700. In general, channel covers 801 may be installed on each side of reduced temperature energy storage device where interconnects 200 extend through cover 600. Channel cover 801 is installed with the open side of each channel facing down, toward a surface of energy storage system 700. Accordingly, the channel cover 801 shown in FIG. 13 is inverted relative to the channel cover 801 shown in FIG. 12. In other words, substrate 802 is spaced apart from the surface of the energy storage device by the height of dividers 811. In this arrangement, a top surface of the energy storage device encloses each channel, with each end of each channel remaining open.

The external portion of one or more interconnects 200 is disposed within each channel 803, 805, 807. In the embodiment shown, three interconnects 200 are disposed within channel 803, three interconnects 200 are disposed within channel 805, and three interconnects 200 are disposed within channel 807. In some embodiments, for example, in the embodiment shown, the same number of interconnects are disposed within each channel. Bend portions 803c, 805c may be necessary to accomplish this. As shown in FIG. 15, a top side of energy storage system 700 includes two rows of interconnects 200: a first row comprising three linearly aligned interconnects 200 and a second row comprising six linearly aligned interconnects 200. Accordingly, channels 803, 805 each include corresponding bend portions 803c, 805c so that the second row of six linearly aligned interconnects 200 can be disposed half within channel 803 and half within channel 805.

A cooling fluid, for example, air, may flow through channels 803, 805, 807 to provide cooling to interconnects 200. As air flows through each of channels 803, 805, 807, heat in the protrusions 211 of interconnect 200 that extend into channels 803, 805, 807 is transferred to the air, cooling the protrusions 211, interconnects 200, and the energy storage cells attached thereto. Accordingly, air entering a channel may be cooler than air leaving the channel. For example, cool air enters channel 807 at first end 807a. As the air passes the first interconnect 211 some heat is transferred to the air, raising its temperature. The temperature of the air may raise with each interconnect 211 that the air passes, such that the air exiting at second 807b has a higher temperature than that entering first end 807a. Accordingly, the ability of the air to cool successive interconnects 211 is decreased with each successive interconnect. Thus, it may be desirable to limit the number of interconnects within each channel, which can be accomplished by increasing the number of channels formed on a channel cover 801. The number of interconnects within each channel can also be limited, for example, by laterally offsetting an inlet of a channel relative to an outlet of the same channel. For example, channels 803 and 805 each have a laterally offset inlet and outlet, to allow each channel to have a limited number of interconnects therein, even if, for example, the interconnects are laterally aligned with respect to each other along a width of the common side of the housing.

The cooling effects within each channel can also be varied by adjusting the cross-sectional area of the inlet and outlet. For example, a channel with a larger cross sectional area within portions of the channel that contain the interconnects can provide increased cooling to those interconnects.

In the embodiment shown, each channel has been limited to contain only three interconnects. It will be understood, however, that different numbers of interconnects may disposed within each channel and different numbers of channels may be used.

In some embodiments, cooling fluids other than air may be flowed through the channels to provide for improved cooling. For example, in some embodiments liquids, like water or other coolant, may be used.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An energy storage system, comprising:
   a first energy storage cell;
   a second energy storage cell; and
   a first interconnect configured to electrically connect the first energy storage cell and the second energy storage cell in series, the interconnect comprising:
   a support member configured to extend between the first energy storage cell and the second energy cell in a first direction; and
   a plurality of protrusions extending upwardly away from the support member, at least one protrusion extending a height H from the support member and having a width W in the first direction, and a depth D in a second direction orthogonal to the first direction, wherein a ratio of the width W to the depth D is less than or equal to 2:1; and
   a plurality of dimples disposed on a bottom surface of the support member.

2. The energy storage system of claim 1, wherein a ratio of the depth D to the width W is less than or equal to 2:1.

3. The energy storage system of claim 1, wherein a ratio of the height H relative to at least one of the depth D and the width W is less than or equal to 2:1.

4. The energy storage system of claim 3, wherein a top portion of the at least one protrusion is an approximately semi-spherical shape.

5. The energy storage system of claim 4, wherein the at least one protrusion extends upward from a top surface of the support member, and wherein a dimple from the plurality of dimples is formed on the bottom surface of the support member corresponding to each of the at least one protrusions.

6. The energy storage system of claim 1, further comprising a cover configured to cover the first and the second energy storage cells, wherein an aperture extends through a thickness of the cover, the aperture configured to receive and seal the cover with at least a portion of a corresponding interconnect.

7. The energy storage system of claim 6, wherein the cover includes an inner facing perimeter formed within the aperture, wherein an outer facing perimeter of the support member is configured to engage with at least a portion of the inner facing perimeter of the cover.

8. The energy storage system of claim 7, wherein the inner facing perimeter comprises a first portion and a second portion, and wherein the outer facing perimeter of the support member extends laterally past the first portion and engages with the second portion.

9. The energy storage system of claim 1, wherein at least one of the plurality of protrusions comprises an approximately rectangular cross-sectional shape.

10. The energy storage system of claim 9, wherein the at least one protrusion is tapered along its height H.

11. The energy storage system of claim 1, wherein the plurality of protrusions comprise at least two protrusions spaced relative to each other along a longitudinal axis of the interconnect.

12. The energy storage system of claim 11, wherein the plurality of protrusions comprise a matrix of at least two rows of protrusions and two columns of protrusions.

13. The energy storage system of claim 1, wherein a gap extends between an outer facing perimeter of the support member and the plurality of protrusions.

14. The energy storage system of claim 1, wherein the first energy storage cell comprises an ultracapacitor.

15. The energy storage system of claim 1, further comprising:
   a second interconnect electrically connecting a third energy storage cell and a fourth energy storage cell in series;
   a housing configured to contain the first, second, third and fourth energy storage cells; and a first channel and a second channel extending along a common side of the housing, wherein, when the first, second, third and fourth energy storage cells are contained within the inner volume, the first channel is in fluid communication with the first interconnect, and the second channel is in fluid communication with the second interconnect.

16. An energy storage system, comprising:
a first energy storage cell;
a second energy storage cell; and
an interconnect electrically connecting the first energy storage cell and the second energy storage cell in series along a longitudinal axis, the interconnect comprising:
 a support member;
 a plurality of protrusions extending upwardly away from the support member, wherein the plurality of protrusions comprise at least two protrusions spaced relative to each other along the longitudinal axis of the interconnect; and
 a plurality of dimples formed on a bottom surface of the support member.

17. The energy storage system of claim 16, wherein the at least two protrusions comprise a matrix of at least two rows of protrusions and two columns of protrusions.

18. The energy storage system of claim 16, wherein a top portion of at least one protrusion is an approximately semi-spherical shape.

19. The energy storage system of claim 16, further comprising a cover configured to cover at least a portion of the first and the second energy storage cells, wherein an aperture extends through a thickness of the cover, the aperture configured to receive and seal the cover with the support member.

20. The energy storage system of claim 19, wherein the cover includes an inner facing perimeter formed within the aperture, wherein an outer facing perimeter of the support member is configured to engage with at least a portion of the inner facing perimeter of the cover.

21. The energy storage system of claim 20, wherein the inner facing perimeter comprises a first portion and a second portion, and wherein the outer facing perimeter of the support member extends laterally past the first portion and engages with the second portion.

22. The energy storage system of claim 16, wherein a gap extends between an outer facing perimeter of the support member and the plurality of protrusions.

23. The energy storage system of claim 16, wherein at least one protrusion extends a height H from the support member and has a width W in a first direction parallel to the longitudinal axis, and a depth D in a second direction orthogonal to the first direction, wherein a ratio of the width W to the depth D is less than or equal to 2:1.

24. The energy storage system of claim 23, wherein at least one of the plurality of protrusions comprises an approximately rectangular cross-sectional shape.

25. The energy storage system of claim 24, wherein the at least one protrusion is tapered along its height H.

26. The energy storage system of claim 24, wherein a ratio of the height H relative to at least one of the depth D and the width W is less than or equal to 2:1.

27. The energy storage system of claim 16, wherein the at least two protrusions extends upward from a top surface of the support member, and wherein a dimple from the plurality of dimples is formed on the bottom surface of the support member corresponding to each of the at least two protrusions.

* * * * *

UNITED STATES PATENT AND TRADEMARK OFFICE
CERTIFICATE OF CORRECTION

| | | |
|---|---|---|
| PATENT NO. | : 9,653,824 B2 | Page 1 of 1 |
| APPLICATION NO. | : 15/091864 | |
| DATED | : May 16, 2017 | |
| INVENTOR(S) | : Kevin T. Stone et al. | |

It is certified that error appears in the above-identified patent and that said Letters Patent is hereby corrected as shown below:

In the Specification

In Column 7 at Line 33, Change "and or" to --and/or--.

In Column 10 at Line 62, Change "and or" to --and/or--.

In Column 11 at Line 4, After "energy" insert --storage--.

In the Claims

In Column 16 at Line 2, In Claim 1, after "second energy" insert --storage--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*